2,937,480

HIGH PRESSURE POLISHING OF FLAT GLASS

Yvan Peyches, Paris, France, assignor to Societe Anonyme des Manufactures des Glaces et Produits Chimiques de Saint-Gobain, Chauny & Cirey, Paris, France No Drawing. Filed Jan. 17, 1957, Ser. No. 634,631

Claims priority, application France Jan. 15, 1957

11 Claims. (Cl. 51—283)

This invention relates to the manufacture of that glass which is known in the trade as flat glass, as distinguished from optical glass and hollow ware, and is particularly related to the polishing of flat glass made by continuous processes, in which the glass is melted, formed as a continuous sheet, advances toward the grinders, is ground and is polished. In this invention we distinguish between flat glass, which has its own definition, hollow ware and optical glass, as each has its special problems and techniques, which are not interchangeably usable.

The invention will be described in relation to the continuous production and preparation of plate glass, in which the glass is melted, fined, conditioned, formed as a continuous sheet of appropriate thickness, is ground, usually by cast iron runners and sand, and polished, usually with aqueous rouge first in a wet stage, and then in a dry stage. There are numerous variations of the process, each having merit of its own. Those classical methods provide a series of polishing tools called runners in sequence along the path travelled by the sheet; in one type the grinding and polishing is done one side at a time and in another it is done on both sides of the sheet at the same time. The runners used have been circular disks, in classical machines, but in one of the copending applications referred to herein a new method involving long bar runners is described. The present invention is useful with both systems.

It is an object of the invention to reduce the number of runners which are spaced in sequence along the direction of motion of the glass.

It is another object to reduce the time required to polish flat glass, or in the alternative, to increase the area of glass that can be polished in a given time, compared to the classical methods.

Another object is to extend the invention of copending case, application Serial No. 165,858, filed June 2, 1950, for "Method and Apparatus for Polishing," in which polishing is carried to completion in the wet phase and the dry phase is eliminated, to tools of less specialized character such as the felts that are standard equipment in classical methods of polishing.

Another object is to reduce the spacing that is required between runners in machines of prior art type and thus to make possible the construction of shorter polishing machines and the reduction of the length of buildings required to house them.

Another object is to use increased pressure in polishing glass without cracking the glass. At the present time the classical methods of glass polishing are limited to maximum pressures of about 15 kg./sq. dm. It is a particular object to apply much higher pressures to classical machines and especially to the novel machines and new processes utilizing long bar runners actuated with a periodic movement of translation which is executed according to closed directing curves and has an amplitude comprised between about one millimeter and several centimeters, as described in copending case, application Serial No. 288,824, filed May 20, 1952, for "Process and Apparatus for Surfacing Glass," now Patent No. 2,787,100.

Another object is to produce flat glass with an improved and superior polish compared to the polish that may be applied by classical methods, the superiority of which may be determined under the microscope.

Other objects and advantages of the invention will be stated as the description of the invention proceeds.

The objects of the invention are accomplished, generally speaking, by polishing flat glass with pressures of the runners over about 25 kg./sq. dm. while supplying the glass beneath the runners with a continuous and abundant flow of an aqueous polishing medium. As a consequence of this invention the glass may be polished in a shorter period of time than by classical methods, with elimination of the dry stage of polishing, and often with the production of a surface superior to that which can be produced by classical methods, being freer of pits and scratches as determined under the microscope.

In the classical system the pressure applied to the glass by the runners in the polishing stage, to which this invention particularly applies, is at a maximum at a pressure on the order of 15 kg./sq. dm. The first classical polishers receive an abundant supply of abrasive sludge and carry out the first, or wet stage, of the polishing operation. The sludge is supplied at a rate of about 0.4 litre per hour per sq. dm. of surface of the tool. The rate of supply of the sludge is progressively reduced in the following runners, producing a polishing of increasing dryness until the final stages are carried out with dry felts. This system will produce the defect called orange peel unless the diminution of the polishing liquid is carried out with good regulation, which is an inconvenience.

In one of the cases identified, an invention has been described in which the dry stage of polishing has been eliminated by the use of runners having faces composed of rubber or a rubbery resin of a specified degree of hardness, Shore 84–92, which is supplied continuously with an aqueous sludge. It is not, however, desirable to be limited to the use of such specialized tools, as the felts of standard practice have definite merits of their own.

By means of this invention one may obtain a polish of excellent quality, and even of a quality superior to that of classic systems, with the new tools and with classical tools using the classic felts, while obtaining the advantages that are the objects of the invention. The pressures to which the felts are submitted, while abundantly supplied with aqueous abrasive such as rouge in water, are much greater than those customarily employed and well beyond those that are tolerable to the glass in classic methods.

The process has the advantage of great simplicity because the supply of sludge may be the same to all the polishing runners. In particular, because of the heavy pressure the polishing is completed with a speed superior to that which was possible with prior methods. This allows the glassmaker to complete the polishing of a moving ribbon or a sheet of glass, at any given velocity of the glass, with a reduced number of runners in the line and with a consequent reduction in the size and cost of the installation.

The polishing runners may be faced with any of the facings that have been found successful in polishing, such as felts and rubber and rubbery synthetic resins, which are, at least to a degree, compressible.

The high pressure used, which may be more than twice the customary maximum available for use against flat glass, produces an intense abrasion, high friction, and the release of enough heat to cause local overheating of the glass capable of breaking it, but the process of the invention includes the use of a sufficient rate of flow of the aqueous liquid polish to the surfaces under the runners, at whatever liquid pressure is necessary to maintain the rate, to absorb the heat generated. It is of interest not to overstep the rate of flow which is necessary for preventing those local overheatings which would break the glass. Otherwise the exuding liquid would lessen the polishing work.

As an example, when the polishing runners are faced with classical felts, and pressure circa 25 kg./sq. dm. is used, it is satisfactory to use a classical density of polish (e.g. English rouge in water forming a sludge having a density on the order 1.05 to 1.25), at a rate comprised between 10 and 30 litres per hour per sq. dm. The higher the pressure used on a runner, the more abundant will be the supply of sludge in order to absorb the increased generation of heat. Thus, for a pressure of 45 kg./sq. dm. one would use about between 15 and 60 litres per hour per sq. dm. of the same sludge, and for 70 kg./sq. dm. a supply comprised between 25 and 90 litres per hour per sq. dm.

The invention is applicable to all shapes of runners, for instance to the classical disks, but is particularly valuable with the long bar type in which the runners extend across the glass from one side to the other, and are in the form of long narrow bars disposed one after another along the path of the moving glass. In such machines, if the amplitude of the movement of the bars is small, as described in the precited application S.N. 288,824, it is possible to place the runners close together for reducing the length of the apparatus. The heat then finds little place for escape, and overheating is relatively easy with high pressure. However, by means of this invention, it is possible to put the long bar runners very close together and to remove the heat generated by absorption in the flow of polishing fluid itself.

When polishing goes forward on both sides of the glass at the same time, the invention is very valuable, as the runners face each other on opposite sides of the glass, the heating is about the same on opposite sides, the heat generated is equally removed from both sides by the flow of aqueous polish, and the pressures are balanced by the opposed runners.

By way of example, there are given hereafter working characteristics of an apparatus for polishing simultaneously the two surfaces of a continuous ribbon of glass according to the method of the present invention.

This apparatus is provided with pairs of rectangular runners cooperating on both faces of the ribbon of glass. The runners extend transversely to the ribbon of glass from one edge to the other. Their working surface is provided with grooved felts such as described in copending U.S. patent application Ser. No. 602,982, filed on August 9, 1956, for "Polishing of Plate Glass."

The polishing runners are actuated with a homocircular translatory motion of 25 mm. radius, at a rate of 400 r.p.m. The pressure exerted by the working surface of the runners on the glass is 45 kg./sq. dm.

The runners are fed through their grooves by a liquid suspension of English rouge having a density on the order 1.20 at a rate of 35 litres per hour and per sq. dm. of the effective working surface of the runners.

Only five pairs of cooperating runners are sufficient for obtaining an excellent quality of polish of the two surfaces of the glass ribbon, moving at a rate of the order of 2.5 m. per minute.

Among the advantages of the invention are the accomplishment of the objects listed above, an improvement in the design of polishing apparatus, a reduction in the dimensions of polishing apparatus and factory buildings, an increased productivity, a reduced cost of manufacture, a superior product, reduced breakage, and an advance in the novel methods described in one of the identified cases.

As many apparently widely different embodiments of the present invention may be made without departing from the spirit and scope thereof, it is to be understood that the invention is not limited to the specific embodiments.

What is claimed is:

1. The method of polishing flat glass that comprises rubbing the glass with felts, with an abundant flow of polishing sludge extending substantially throughout the polishing, at a pressure at least 25 kg./sq. dm., and a flow of polishing sludge, having a density about 1.05 to 1.25, at about 10 litres per hour per sq. dm.

2. The method of polishing flat glass that comprises rubbing the said material with polishing runners having compressible facings, at a pressure at least 25 kg./sq. dm., and supplying the runners with a substantially continuous flow of aqueous abrasive substantially throughout the duration of the polishing.

3. The method of polishing flat glass that comprises rubbing the said material with polishing runners having compressible facings, at a pressure at least 25 kg./sq. dm., and supplying the runners with a substantially continuous flow of aqueous abrasive substantially throughout the duration of the polishing, the flow being between 10 and 30 litres per hour per sq. dm. of rouge in water of density between about 1.05 and 1.25 for pressures about 30 kg./sq. dm., between 15 and 60 litres per hour for a pressure of about 45 kg./sq. dm., and between 25 and 90 litres per hour for a pressure of about 70 kg./sq. dm.

4. The method of polishing flat glass that comprises rubbing the said material with polishing runners having compressible facings, at a pressure between 25 and 70 kg./sq. dm. and supplying the runners with a substantially continuous flow of aqueous abrasive substantially throughout the duration of the polishing.

5. The method of polishing flat glass by rubbing it with felt and a polish that comprises flowing the polish between the material being polished and the felt in aqueous medium substantially throughout the polishing while maintaining a pressure of the felt on the material being polished at a minimum of 25 kg. per sq. dm., and cooling the material being polished by regulating the rate of supply of the aqueous polish to the felt.

6. The method of polishing flat glass that comprises rubbing the surface thereof with a runner under pressure in a range having a minimum of 25 kg./sq. dm. and flowing an aqueous polishing liquid between the glass and the working face of the runner at a rate sufficient to prevent overheating capable of breaking the glass and at a pressure sufficient to supply the whole surface beneath the runner with a continuous flow.

7. The method of polishing flat glass that comprises rubbing the surface thereof with a long bar runner having its working face provided with alternate lands and grooves and which is actuated with a periodic translatory motion along closed directing curves with an amplitude comprised between about one millimeter and several centimeters, applying said runner to the glass sheet under pressure in a range having a minimum of 25 kg./sq. dm. and forcing through the intermediary of the grooves an aqueous polishing liquid between the glass and the working face of the runner at a rate sufficient to prevent overheating capable of breaking the glass and at a pressure sufficient to supply the whole surface beneath the runner with a continuous flow.

8. The method of polishing flat glass according to claim 6 in which the pressure exerted by the polishing runner on the glass surface is comprised between 35 and 80 kilograms per square decimeter.

9. The method for the continuous polishing of a glass sheet in which the glass sheet has a rectilinear translation movement with respect to the polishing tools, that comprises submitting the surface of the glass sheet to the action of polishing tools exerting on the sheet a pressure of at least 25 kilograms per square decimeter and feeding a liquid containing an abrasive material to the working surface of the tools at a rate sufficient to prevent overheating capable of breaking the glass.

10. The method according to claim 9, in which the whole polishing operation is carried out with polishing tools exerting on the sheet a pressure of at least 25 kilograms per square decimeter, and fed with a liquid containing an abrasive material at a rate which is sufficient to prevent overheating capable of breaking glass and which can be the same for all the polishing tools.

11. The method according to claim 9 for the continuous polishing of a glass sheet in which the polishing tools have a rectangular shape, the tools extend over substantially the entire width of the glass sheet, and the tools are actuated with a periodic translatory motion along closed directing curves of small amplitude.

References Cited in the file of this patent

UNITED STATES PATENTS

| | | |
|---|---|---|
| 1,962,766 | Crowley et al. | June 12, 1934 |
| 1,962,767 | Crowley et al. | June 12, 1934 |
| 2,787,100 | Peyches | Apr. 2, 1957 |